United States Patent [19]

Perry et al.

[11] 4,370,566

[45] Jan. 25, 1983

[54] APPLIANCE CONTROL SYSTEM

[75] Inventors: Leroy A. Perry, Danville; Charles E. Scott, Noblesville, both of Ind.

[73] Assignee: Emhart Industries, Inc., Indianapolis, Ind.

[21] Appl. No.: 254,377

[22] Filed: Apr. 15, 1981

[51] Int. Cl.$^3$ ............................................. H01H 43/00
[52] U.S. Cl. .................................................... 307/141
[58] Field of Search ........................ 307/141; 318/444

[56] References Cited

U.S. PATENT DOCUMENTS

| Re. 29,086 | 12/1976 | Murphy et al. | 307/141 |
|---|---|---|---|
| 3,320,442 | 5/1967 | Todrank | 307/141 |
| 3,360,092 | 12/1967 | McConnell | 194/9 |
| 3,662,186 | 5/1972 | Karklys | 307/141 |
| 3,876,950 | 4/1975 | O'Connor | 328/130 |
| 4,031,507 | 6/1977 | Johnson et al. | 340/41 R |
| 4,104,542 | 8/1978 | Karklys et al. | 307/141 |
| 4,134,027 | 1/1979 | Scott et al. | 307/141 |
| 4,254,460 | 3/1981 | Achter et al. | 307/141 X |

FOREIGN PATENT DOCUMENTS 726369  1/1966  Canada ................................ 307/141

Primary Examiner—Donald A. Griffin
Attorney, Agent, or Firm—Robert F. Meyer; David W. Gomes

[57] ABSTRACT

A control system for an appliance having a plurality of different operational cycles, provides cam operated switches for controlling the coupling of electrical power to the appliance, the switches including a plurality of rotatable cams for operating the switches in response to the rotational position of the cams, the switches being adapted for electrical rotation of said cams, a digital electronic control circuit for controlling the electrical cam rotation, the control circuit including circuitry for receiving a selection of any one of the cycles for the operation of the appliance, and a second circuit coupled between the switches and the control circuit and responsive to the circuitry for receiving for supplying information on the rotational position of the cams to the control circuit to enable control of the electrical rotation in accordance with a cycle selection.

15 Claims, 5 Drawing Figures

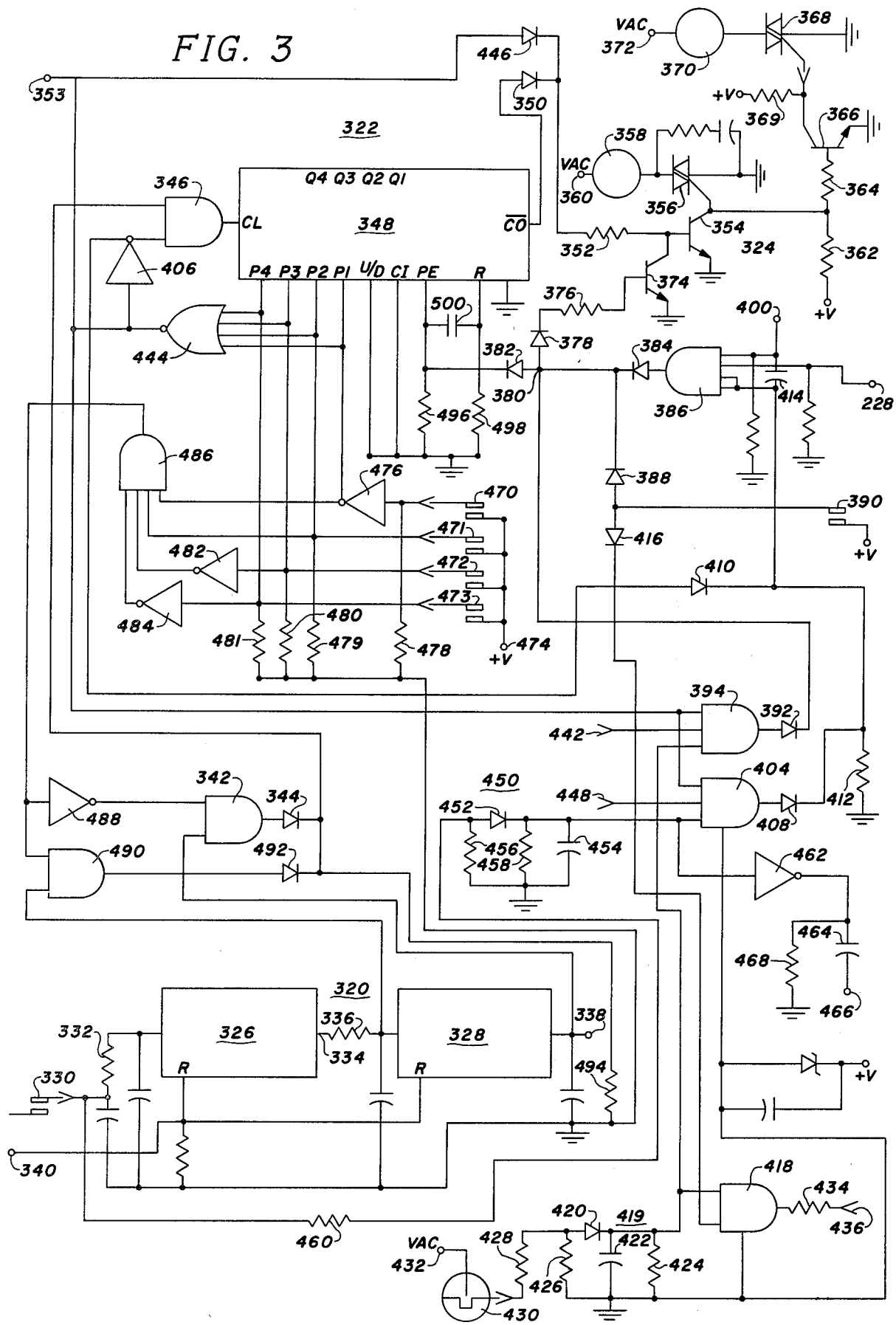

APPLIANCE CONTROL SYSTEM

BACKGROUND OF THE INVENTION

1. Field of the Invention

This invention generally relates to apparatus control systems and, in particular, to such systems which include mechanical cam switching means and associated electronic control circuitry.

2. Statement of the Prior Art

Various types of automated control systems for multifunction apparatuses are well known and widely used. In the area of apparatuses referred to as household appliances, the most common form of automated control system generally includes a mechanical cam which controls various switches for connecting power to the multiple operational functions involved. The cams are produced to allow their respective operational function to be operative during a certain amount of cam rotation and the speed of cam rotation is controlled to determine the operational time of the function. Rotational power for the cam can be derived from either mechanical sources, such as springs, or electromechanical sources, such as motors or solenoids. Likewise, the speed of cam rotation can be controlled either mechanically or electrically. Examples of such automatic control systems using electrically driven cams and electrical circuitry to control the rate of rotation of the cam are disclosed by U.S. Pat. Nos. 3,350,606, 3,360,902 and U.S. Pat. No. Re. 29,086. When used in simple control applications, such mechanisms are reliable and relatively inexpensive. However, difficulties are encountered when adapting such mechanisms to more complicated control environments because the mechanical complexity of the control apparatus greatly increases. Under these circumstances, the cost of producing the mechanism greatly increases.

Another major area of multifunction apparatus control system development has been that of digital or solid state electronics. Generally, through the use of relatively low cost digital circuits, such as the CMOS type, it is relatively easy to construct a control system with a high degree of complexity in the control function. More expense is generally incurred in the interface area between the digital electronics and the operational functions which generally require high power energy sources.

SUMMARY OF THE INVENTION

Accordingly, the present invention includes a control system which takes advantage of both the high degree of control complexity provided by digital electronic controls and the power switching generally provided by a rotating cam switch. More specifically, the present invention includes a control system for an appliance having a plurality of different operational cycles, comprising cam operated switch means for controlling the coupling of electrical power to the appliance, the switch means including a plurality of rotatable cams for operating the switch means in response to the rotational position of the cams, the switch means being adapted for electrical rotation of the cams, digital electronic control circuit means for controlling the electrical rotation, the control circuit means including means for receiving a selection of any one of the cycles for the operation of the appliances, and second circuit means coupled between the switch means and the control circuit means and responsive to the means for receiving for supplying information on the rotational position of the cams to the control circuit means to enable control of the electrical rotation in accordance with a cycle selection. The present invention alternatively includes a method for controlling an appliance having a plurality of different operational cycles, comprising controlling the coupling of electrical power to the appliance by cam operated switch means including a plurality of rotatable cams for operating the switch means in response to the rotational position of the cams, rotating the cams by electromotive means, controlling the rotating of the cams with digital electronic control circuit means, the controlling including receiving a selection of any one of the cycles for the operation of the appliance, and coupling information on the rotational position of the cams from the switch means to the control circuit means, the coupling being responsive to a received selection of an operational cycle to enable control of the rotating of the cams in accordance with a received cycle selection.

BRIEF DESCRIPTION OF THE DRAWINGS

The present invention is illustratively described in relation to the accompanying drawings in which:

FIG. 3 is a schematic diagram of yet another portion of the control circuit of FIGS. 1A, 1B and 2.

DETAILED DESCRIPTION OF THE DRAWINGS

Figure 1A:
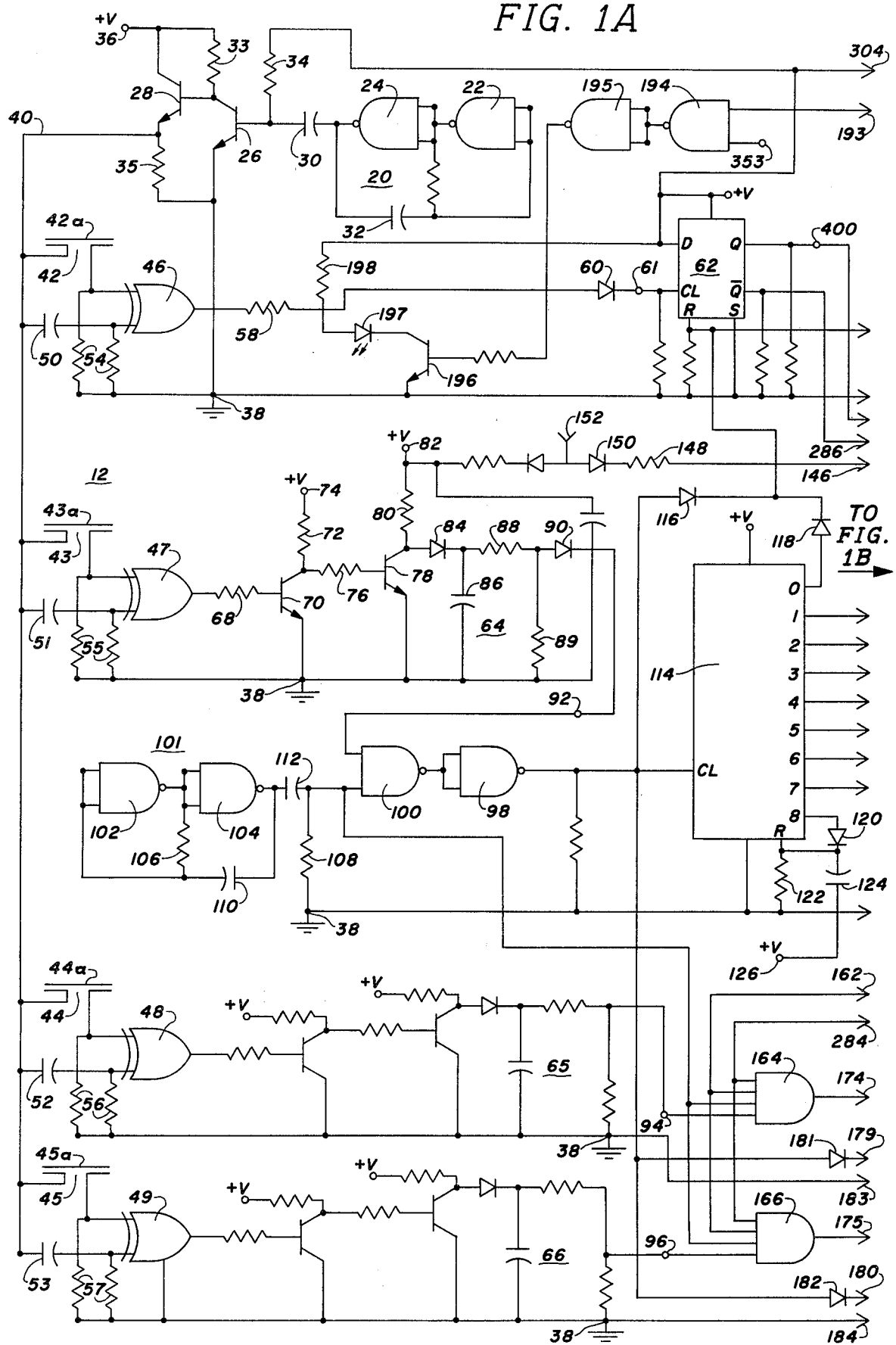
FIGS. 1A and 1B form a schematic diagram of a portion of a control circuit constructed according to the present invention.
Figure 1B:
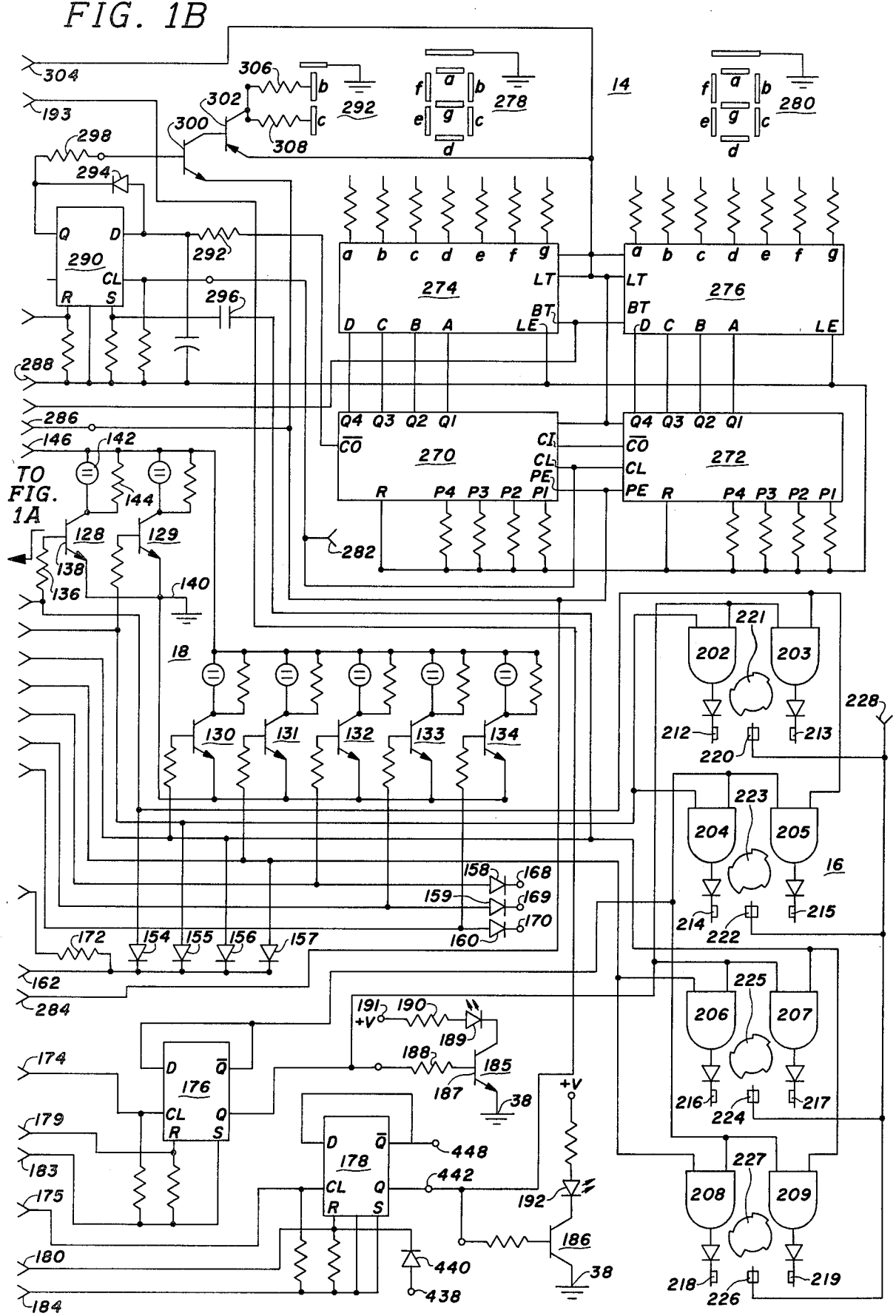

FIGS. 1A and 1B combine to form a schematic diagram of a portion of one embodiment of the present invention. FIGS. 1A and 1B are properly aligned by aligning the legends "to FIG. 1B" and "to FIG. 1A." Some electrical lines continuing from FIG. 1A to FIG. 1B appear with the same terminal numbers at the end thereof. The combined figures generally include an input section 12, a time display section 14, a cam switching section 16, a function selection and display 18 and related control circuitry.

The input section 12 includes an oscillator circuit 20 having NAND gates 22 and 24, NPN transistors 26 and 28, capacitors 30 and 32 and resistors 33, 34 and 35. The terminal 36 is connected to a positive DC voltage supply and the ground connection 38 acts as the DC return therefor. The output of oscillator 20 appears on line 40 or across the emitter resistor 35 of transistor 28. The oscillating output of line 40 is connected to a plurality of capacitive touch switches 42, 43 44 and 45. The switches 42-45 each include a touch plate sensor, appearing with the suffix a and the respective switch number to which the oscillation signal of line 40 is capacitively coupled. The switches 42-45 is each coupled to one input of a respective exclusive OR gate 46, 47, 48 and 49 via capacitive coupling to the respective touch sensor 42a-45a. The other inputs of exclusive OR gates 46-49, are all connected via capacitors 50, 51, 52 and 53, respectively, to the oscillation signal of line 40. Both inputs of each of the exclusive OR gates 46-49 are also coupled to the ground connection 38 through separate resistors as shown.

The output of exclusive OR gate 46 is connected through a resistor 58, a diode 60 and a terminal 61 to the clock input of a D-type flip-flop 62. The outputs of exclusive OR gates 47-49 are each connected to a separate but identical output circuit 64, 65 and 66, respectively. Only circuit 64 is described herein but the description is the same for circuits 65 and 66. The output of exclusive OR gate 47 is connected through a resistor 68 to the base of an NPN transistor 70, the emitter of which is connected to the ground 38. A resistor 72 connects a positive voltage supply such as 12 volts from a terminal 74 to the collector of transistor 70. A resistor 76 connects the collector of transistor 72 to the base of an NPN transistor 78 the emitter of which is also tied to ground 38. A collector resistor 80 connects the collector of transistor 78 to a positive voltage DC supply such as +100 volts at the terminal 82. The collector of transistor 78 is further connected to the anode of a diode 84 the cathode of which is connected through a capacitor 86 to the ground 38. A pair of resistors 88 and 89 are connected in series between the cathode of diode 84 and the ground 38. Another diode 90 connects between resistors 88 and 89 with its anode and couples the output of circuit 64 to a terminal 92. The outputs of circuits 65 and 66 likewise appear at their respective terminals 94 and 96.

The output of circuit 64 at terminal 92 is coupled to a gating circuit including a pair of NAND gates 98 and 100 at an input to gate 100. The other input of gate 100 is connected to an oscillator circuit including NAND gates 102 and 104. Coupled to NAND gates 102 and 104 for providing an oscillating signal having a one second interval, are resistors 106 and 108 and capacitors 110 and 112. The output of the oscillator is further connected as described below. The output of NAND gate 100 is connected to both inputs of NAND gate 98 which therefore acts as an inverter. The output of NAND gate 98 is connected to the clock input of a decade counter 114 located in the function selection and display section 18. The output of NAND gate 98 is further coupled through an isolation diode 116 to the reset input of D-type flip-flop 62.

Decade counter 114 has ten decoded outputs, nine of which are shown. A suitable integrated circuit which can be used for the counter 114 is available from National Semiconductor under part number CD4017BM or CD4017BC. The decade counter 114 is also coupled to the reset input of D-type flip-flop 62 by an isolation diode 118 connected with its anode to the zero output of counter 114. Seven of the remaining decoded outputs of counter 14 represent the various functions which may be selected for the operation of the apparatus. Illustrative examples of different functions for use in a dishwasher would be light load, normal load, pots and pans, heavy load, rinse and hold, cancel, and plate warm. The next sequential output terminal 8 of counter 114 is connected through a diode 120 to the reset input of counter 114 which in turn is connected through a resistor 122 to the DC return or ground 38 and by a capacitor 124 to a positive voltage potential 126 for the circuit. In operation, when the output terminal 8 goes to a logical high, voltage created across resistor 122 causes the decade counter 114 to reset.

The seven decoded outputs 1 through 7 of counter 114 are further connected to individual display means 128-134. Display means 128 is typical of each of the display means 128 through 134 and includes a resistor 136 having one end connected to the respective counter 114 output and the other end connected to the base of a transistor 138. The emitter of transistor 138 is connected in common with the respective emitters from each of the display sections 129 through 134 and to a ground terminal 140. The collector of transistor 138 is connected to an individual parallel combination of a display or neon lamp 142 and a resistor 144. The other interconnection of each of the lamp-resistor combinations are connected in common and to a source of DC voltage, through a terminal 146, formed by a resistor 148, a rectifying diode 150 and an input terminal 152 for an alternating current voltage source. When each of the output terminals 1 thrugh 7 is energized on counter 114, the respective lamp 142 is lighted. The outputs 1 through 7 of counter 114 are further each connected to the anodes of individual diodes 154 through 160 respectively. The cathodes of diodes 154 through 157, representing the outputs 1 through 4 of counter 114 are connected in common and through a terminal 162 to one input each of NAND gates 164 and 166. The cathodes of diodes 158 through 160, representing the outputs 5, 6 and 7, are connected to individual terminals 168 through 170, respectively. A resistor 172 couples the common interconnection of the cathodes of diodes 154 through 157 to the ground terminal 38 The output terminal 94 of circuit 65 is connected to another input of NAND gate 164, and the output terminal 96 of circuit 66 is connected to another input of NAND gate 166. The output of the oscillator formed by NAND gates 102 and 104, which appears across a resistor 108, is connected to another input of each of NAND gates 164 and 166. The outputs of NAND gates 164 and 166 are connected through terminals 174 and 175 respectively to the clock inputs of a pair of D-type flip-flops 176 and 178, respectively. Each of the D-type flip-flops 176 and 178 has its Q not output coupled to its D input. The reset inputs of D-type flip-flops 176 and 178 are coupled through terminals 179 and 180 and diodes 181 and 182, respectively, to the clock input of counter 114 and thus receive the clocking signal from NAND gate 98. The set input of D-type flip-flops 176 and 178 are coupled through terminals 183 and 184 respectively to ground terminals 38. The Q outputs of D-type flip-flops 176 and 178 are connected to individual display means 185 and 186, respectively. Each of the display means 185 and 186 typically includes an NPN transistor 187 having a base coupled through a resistor 188 to the respective Q output, an emitter coupled to a respective ground terminal 38 and a collector coupled through a light emitting diode 189 and a resistor 190 to a positive voltage potential connected at a terminal 191. The light emitting diodes 189 and 192 visually signal the energization of the Q outputs of the respective D-type flip-flops 176 and 178. The Q output of flip-flop 178 is further connected through a terminal 193 to one input of a NAND gate 194 the output of which is coupled through an inverter 195 to the base of an NPN transistor 196. The emitter of transistor 196 is grounded and the collector is connected through a light emitting diode 197 and a serially connected resistor 198 to a positive voltage potential. Thus when the Q output of flip-flop 178 is energized, the light emitting diode 197 can be illuminated to indicate that state.

The Q and Q not outputs of flip-flop 176 are connected to inputs of AND gates 202 through 209 located in cam switching section 16. The Q output of flip-flop 176 is connected to one input of each of AND gates 202, 203, 206 and 207. The Q not output is connected to one input of each of AND gates 204, 205, 208 and 209. The other inputs of AND gates 203 and 205 are connected to the 1 output of counter 114. The other inputs of AND gates 202 and 204 are connected to the 2 output of counter 114. The other inputs of AND gates 207 and 209 are connected to the 3 output of counter 114, and the other inputs of AND gates 206 and 208 are connected to the 4 output of counter 114. The outputs of each AND gate 202–209 are connected through individual isolation diodes such as 210 to individual cam actuated switch contacts 212 through 219. Contacts 212 and 213 may alternatively form an electrical connection with another contact 220. Contacts 214 and 215 may alternatively form an electrical connection with a contact 222. Contacts 216 and 217 may alternatively form an electrical connection with a contact 224, and contacts 218 and 219 may alternatively form an electrical connection with an electrical contact 226. Contacts 220, 222, 224 and 226 are connected in common and to a terminal 228 and are mechanically operated to electrically couple with their respective contacts 212-219 by individual cams 221, 223, 225 and 227, respectively. The cams 221, 223, 225 and 227 contain information concerning operation of a selectable "power miser" function represented by flip-flop 176 in respect to the first four operational functions represented by outputs 1-4 of counter 114.

Figure 2:
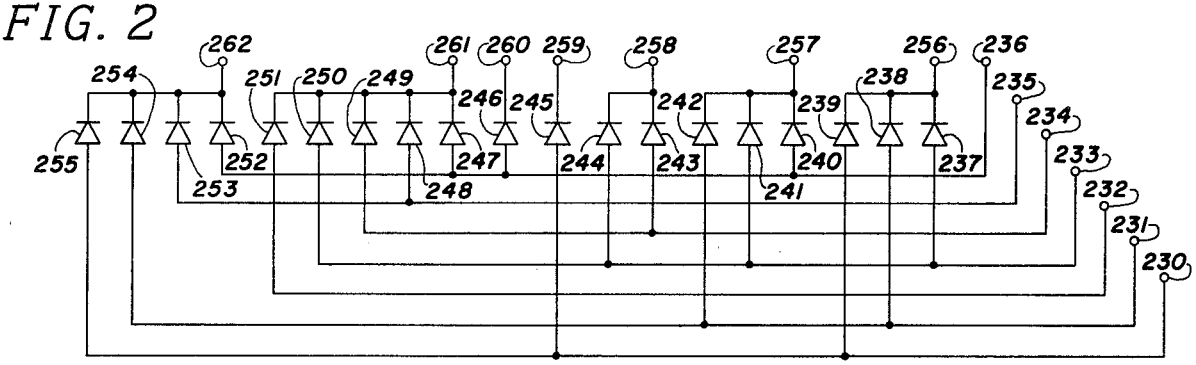
FIG. 2 is a schematic diagram of another portion of the control circuit of FIGS. 1A and 1B.

In brief reference to FIG. 2, a decoder is shown having input terminals 230 through 236 which are connected to the 1 through 7 outputs of counter 114, respectively. A multiplicity of diodes 237 through 255 have their anodes connected to various of the input terminals 230 through 236 and their anodes connected to various output terminals 256 through 262. The significance of these connections is described immediately below in reference to display section 14 of FIG. 1.

The counting and display section 14 generally includes a pair of binary decimal up/down counters 270 and 272. Such counters are commonly available from various semiconductor manufacturers such as National Semiconductor, whose part number is CD4510BM or CD4510BC. Each of the counters 270 and 272 is coupled to an individual BCD-TO-7 segment latch/decoder/driver 274 and 276. Such units are available from various semiconductor manufacturers such as National Semiconductor under the part number designation CD4511BM or CD4511BC. The drivers 274 and 275 is each coupled with a seven segment display 278 and 280, respectively. Any suitable form of seven segment display may be used such as light emitting diodes in the present case. The terminals designated a through g on the drivers 274 are connected to the respective display segments a through g of the respective displays 278 and 280 through individual resistors as shown. The inputs for the drivers 274 and 276 are binary coded decimal signals connected to terminals A through D thereof. The binary coded decimal signals for the drivers 274 and 276 are provided by the Q1 through Q4 outputs of each of the respective counters 270 and 272. As arranged, the counter 272 represents the units of minutes digit as displayed by display unit 280 and the counter 270 represents the tens of minutes digit as displayed by unit 278. The carry-out terminal of counter 272 is therefore connected to the carry-in terminal of counter 270. The clock terminals of counters 270 and 272 are connected in common and to a terminal 282.

The preset enable inputs of counters 270 and 272 are also connected in common and through a terminal 284 to an additional input of each of NAND gates 164 and 166. The preset enable input of counters 270 and 274 is further connected through another terminal 286 to the Q not output of flip-flop 62. Preset inputs P1 through P4 on each of the counters 270 and 272 are connected through individual resistors as shown to the ground terminal 38 through a terminal 288, and also to the terminals 256 through 262 of FIG. 2. More specifically, the P3 input of counter 270 is connected to terminal 256, the P2 input to terminal 257, and the P1 input to terminal 258. The P4 input of counter 272 is connected to terminal 259, the P3 input to terminal 260, the P2 input to terminal 261, and the P1 input to terminal 262. By these connections, predetermined operating times are preset into the counters 270 and 272 for counting down and for display. The diodes represent specific number inputs such that when the one output of counter 114 is energized a 4 is generated at the preset inputs to counter 270 and a 9 is generated at the preset inputs of counter 272. The 4 is represented by a logical high on only the P3 input of counter 270 and the 9 is represented by logical highs on the P4 and P1 inputs of counter 272. This represents a time period to be counted down of 49 minutes. Likewise, when any of the counter 114 outputs 2 through 7 is energized, signals representing the respective predetermined operating times are coupled to the preset inputs of counters 270 and 272. The operating times preset by the circuit of FIG. 2 in minutes for each of the respective outputs of counter 114 are as follows: 2, 61; 3, 2; 4, 72; 5, 12; 6, 3; and 7, 27.

A D-type flip-flop 290 is used to control a further light emitting diode display 292 representing hundreds of minutes. For this purpose, the carry-out terminal of counter 270 is connected through a resistor 292 to the D input of flip-flop 290. The D input is connected to the anode of a diode 294 whose cathode is connected to the Q output of flip-flop 290. Clock input of flip-flop 290 is connected to terminal 292 in common with the clock input of counters 270 and 272. The set input of flip-flop 290 is connected through a capacitor 296 to the 3 output of counter 114. Thus when the three output is energized, the set input of flip-flop 290 is likewise energized to represent a 100 minute count which is added to the two minutes determined by the decoder of FIG. 2. The Q output of flip-flop 290 is coupled through a resistor 298 to the base of an NPN transistor 300, the emitter of which is coupled through terminal 286 to the Q not output of flip-flop 62. The collector of transistor 300 is connected to the base of a PNP transistor 302 whose emitter is connected to a positive voltage potential via a terminal 304. The collector of transistor 302 is connected through separate resistors 306 and 380 to the b and c segments of the display 292 which form the numeral "1."

FIG. 3 should be included as a reference for the following discussion. Generally included in FIG. 3 are a minutes counter section 320, an event timer section 322, and a power control section 324 for activation of the cam actuating motor and a machine power relay. The minutes counter section 320 generally includes a pair of 0 to 60 counters 326 and 328. The counter 326 receives a 60 cycle alternating current voltage signal via a pair of cam actuated contacts 330. The signal is fed through a resistor 332 into the counter 326, and every 60 cycles of the signal is counted by counter 326 to generate an output pulse on terminal 334 every one second. This output pulse is fed into counter 328 via a resistor 336. Counter 328 counts every 60 one second pulses to generate an output pulse every minute on a terminal 338. Any suitable 0 to 60 counters may be used for 326 and 328. Each of the counters 326 and 328 has a reset input R connected via a terminal 340 to the Q not output of flip-flop 62. The one minute pulse signal from terminal 338 is coupled to an AND gate 342. The output of AND gate 342 is connected through an isolation diode 344 to the input of a NAND gate 346. The output of NAND gate 346 is connected to the clock terminal of a BCD counter/divider 348, which makes up a substantial portion of the event timing section 322. The output of counter 348 is the count out not terminal which is connected through an isolation diode 350 and a resistor 352 to the base of an NPN transistor 354. The emitter of transistor 354 is grounded and the collector is connected to the gate terminal of a semiconductor switching means, in this case, a triac 356. A first main terminal of triac 356 is grounded and a second main terminal is connected in series with the actuation motor 358, used for driving all of the switch actuating cams of the present system. The other terminal for motor 358 is connected via an output terminal 360 to an alternating current voltage source, the other end of which would be grounded to form a complete circuit through the motor 358 and triac 356. The collector of transistor 354 is further connected through a resistor 362 to a positive voltage source. Thus, when a count out signal is not present from counter 348, the count out not terminal is a logical high or positive voltage which passes through diode 350 and resistor 352 causing transistor 354 to conduct. This substantially grounds the gate input to triac 356 and prevents current from flowing therethrough and activating motor 358 Thus when the count out signal is not present, the motor 358 is not activated. When the count out signal is present from counter 348, it is represented as a logical low on the count out not terminal which enables the transistor 354 to turn off and allows the application of positive voltage from the positive voltage source through resistor 362 to the gate terminal of triac 356. This activates triac 356 and energizes motor 358 to rotate the switch actuating cam means.

The collector of transistor 354 is further connected through a resistor 364 to the base of an NPN transistor 366. The emitter of transistor 366 is grounded and the output is connected to the gate of another triac 368. The collector of resistor 366 is further connected through a resistor 369 to a positive voltage source. The triac 368 is connected in series between ground and a machine power relay 370 which connects and disconnects power to all physical machine functions in response to being either activated or deactivated, respectively. Another terminal of the relay 370 is connected to an alternating current voltage source through a terminal 372 to form a closed circuit through ground and the triac 368. As connected, a logical low or 0 volts signal at the base of transistor 354, which allows activation of triac 356 and the cam motor 358, causes current to flow through transistor 366 substantially grounding the gate of triac 368 and deactivating relay 370. Thus, whenever motor 358 is activated, turning the switch actuating cam, the machinery relay 370 is deactivated disconnecting power through the function switching terminals.

The transistor 354 is further controlled by a transistor 374 having its collector connected to the base of transistor 354. The emitter of transistor 374 is connected to ground and the base thereof is connected through a resistor 376 to the cathode of the diode 378. The anode of diode 378 is connected to a common terminal 380. Terminal 380 is further connected through an isolation diode 382 to the preset enable input of counter 348 Terminal 380 is fed through isolation diodes such as 384 from the output of an AND gate 386, diode 388 from a pair of cam actuated contacts 390, and diode 392 from the output of an AND gate 394. Cam actuated contacts 380 are activated by a feedback cam which is used to connect terminal 380 to a positive voltage source. A positive voltage signal at terminal 380 passes through diode 378 causing transistor 374 to switch on and thus substantially ground the base of transistor 354. As previously noted, this causes activation of the cam motor 358 and deactivation of the relay 370. The inputs to AND gates 386 originate from terminal 400, from terminal 228 of FIG. 1B, and collectively from the outputs of an AND gate 404 and an inverter 406 which are connected through respective isolation diodes 408 and 410. A resistor 412 grounds the common anode terminals of diodes 408 and 410 to insure a logical low or 0 volts in the absence of a logical high on either of the cathodes of diodes 408 and 410. A capacitor 414 is connected between the anode terminals of diodes 408 and 410 and the input of terminal 400. Terminal 400 is connected to the Q output of flip-flop 62 in FIG. 1A.

The cam actuated switch contacts 390 are further connected through an isolation diode 416 to one input of an AND gate 418. The other input of AND gate 418 is coupled to the output of a rectifier-filter network 419 including a rectifying diode 420, a filtering capacitor 422 and resistors 424 and 426. The input of the rectifier-filter network 419 is connected by the anode of diode of 420 through a resistor 428 to a thermostat 430. The other input of thermostat 430 is connected through a terminal 432 to a source of alternating current voltage. In a sani wash operation, where it is desired that the water temperature be at a certain minimum elevated level, the thermostat 430 senses when the water reaches that level and responsively connects the alternating current voltage to the anode of diode 420. This voltage is rectified and filtered to form a positive voltage or logical high on the input of AND gate 418 and also on one of the inputs of AND gate 394. The output of AND gate 418 is connected through a resistor 434 and a terminal 436 to a terminal 438 shown in FIG. 1B. An isolation diode 440 is connected between terminal 438 and the reset terminal of flip-flop 178 which is a control reset for the sani-wash operation.

As mentioned, the terminal 380 is also fed through an isolation diode 392 from the output AND gate 394 and one of the inputs of AND gate 394 is connected to the output of the rectifier diode 420. Another input of NAND gate 394 is connected through a terminal 442 to the Q output of flip-flop 178 The final input of AND gate 394 along with one input of AND gate 404 are fed from the output of a NOR gate 444. The output of NOR gate 444 is connected through isolation diode 446 to resistor 352 and thus to the base of transistor 354, and also to the other input of NAND gate 194 via terminal 353.

As mentioned, one input of AND gate 404 is connected to the output of NOR gate 444. Another input of AND gate 404 is connected through a terminal 448 to the Q not output of flip-flop 178 of FIG. 1b. A third input to AND gate 404 is fed from another rectifying and filtering circuit 450 which includes a diode 452, a capacitor 454 and resistors 456 and 458. The input to rectifying-filtering circuit 450 is connected from the anode of diode 452 through a resistor 460 to the cam actuated switch contacts 330 carrying an alternating current voltage signal for input to counter 326. Thus, when the contacts 330 are closed, an alternating current voltage signal is fed through the rectifying circuit 450 and appears as a positive DC signal at one of the inputs to AND gate 404. This signal is further connected through an inverter 462 and a capacitor 464 to an output terminal 466. A resistor 468 connects the output of the inverter 462 to ground. The terminal 466 is connected to the reset input of decade counter 114 of FIG. 1A. Thus, when the contacts 330 open and the alternating current voltage signal is removed from the input of rectifying circuit 450, its output goes from a logical high to a logical low which is inverted by inverter 462, generating a logical low to logical high transition, which causes the resetting of counter 114 until capacitor 464 charges.

As mentioned, the event timing circuit 322 includes the counter 348 and the output of counter 348 is substantially generated at the count out not terminal. The event times which are to be counted down by the counter 348 are inputted thereto through preset input terminals P1 through P4. These signals are generated from information located on certain switching cams which control four sets of cam actuated terminals 470, 471 472 and 473. One each of contacts 470-473 are connected in common and to a positive voltage source through a terminal 474. The other contacts of each set 470-473 are each coupled to individual preset input terminals P1 through P4 respectively. More specifically, the other contact of set 470 is connected through an inverter 476 to the P1 input; the other contact of set 471 is connected directly to preset input terminal P2; the other contact of set 472 is connected directly to preset input terminal P3; the other contact of set 473 is coupled directly to preset input terminal P4. Resistors 478, 479, 480 and 481 are coupled from the other contacts of sets 470-473, respectively, and have their other ends connected in common and to ground. Inverters 482 and 484 each have their inputs connected to a separate other contact of sets 472 and 473, respectively, and have each of their outputs connected to separate inputs of an AND gate 486. Another input of AND gate 486 is connected to the output of inverter 473 and the last input of AND gate 486 is connected to the other contact of set 471. The output of AND gate 486 is connected to the input of an inverter 488 and one input of another AND gate 490. The output of inverter 488 is connected to the second of two inputs to AND gate 342. The output of AND gate 490 is connected through an isolation diode 492 to the same input of NAND gate 346 as the output of AND gate 342 and its isolation diode 344. The other input of AND gate 490 is connected to the one pulse per second signal generated by counter 326. A resistor 494 is connected between ground and the common cathode connection of diodes 344 and 492.

Returning to counter 348, the NOR gate 444 has four inputs each of which is connected to a separate preset input terminal P1 through P4 of counter 348. The up/down counter, U/D, is coupled to ground to enable the counter 348 to count in the down direction. The count in terminal of counter 348 is grounded to enable the counter 348 to count in response to signals inputted on the clock terminal. The preset enable input of counter 348 is connected through a resistor 496 to ground, and the reset terminal is connected through a resistor 498 to ground. A capacitor 500 connects the preset enable input to the reset input of counter 348. Thus, when the preset enable input receives a positive pulse, capacitor 500 is caused to charge and the voltage generated across resistor 498 causes the resetting of counter 348.

Figure 4:
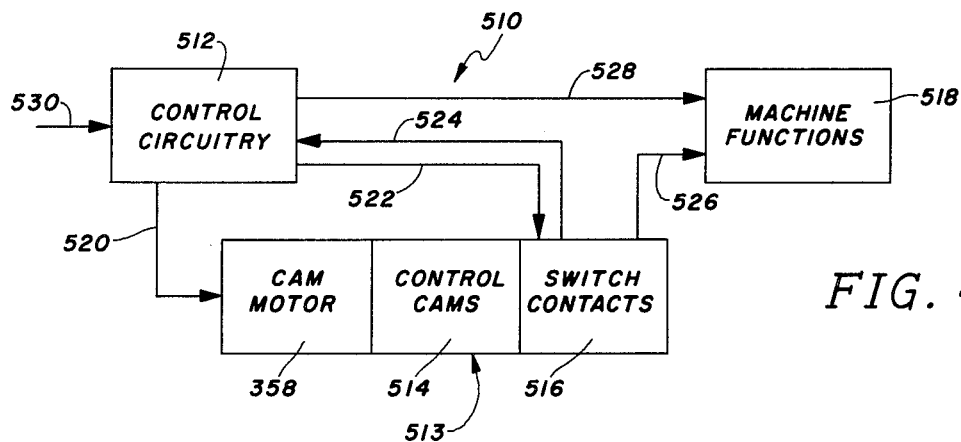
FIG. 4 is a block diagram of a control system constructed according to one embodiment of the present invention and including the control circuit of FIGS. 1A, 1B, 2 and 3.

In reference to FIG. 4, a control system 510 is shown which includes control circuitry 512 as described in reference to FIGS. 1A, 1B, 2 and 3. A switch means 513 includes a cam motor represented by 358 in FIG. 3, a control cam section 514 which is physically rotated or driven by the cam motor 358, and a switch contact section 516 which includes contacts actuated by the control cams and represented by the various contacts shown throughout the Figures (i.e., 212–219, 470–473, 402, 330, etc.). Finally, a machine function block 518 is shown which is intended to include all possible machine functions which can be performed i.e. water pump, motor, heater, detergent dispenser, etc.). As shown, the control circuitry 512 is connected to cam motor 358 by a control line 520. This represents the connection between triac 356 and motor 358 in FIG. 3. The control circuitry 512 is further shown connected to the switch contact section 516 by a pair of lines 522 and 524. Lines 522 and 524 represent the various connections between the control circuitry logic gates and the switch contacts which are used as a means of transferring information to and from the control cams 514. Such information includes selected wash cycles, selected cycle event operation times, etc. Another line 526 is shown connecting switch contacts section 516 to the machine function section 518. This line represents the power control of all of the machine functions via cam actuated switch contacts. A further line 528 connects the control circuitry 512 to the machine functions and represents the control thereof by the machine relay 370 of FIG. 3. Also, an input line 530 represents input power to the control system 510.

In operation, the control system 510 and more particularly the control circuitry 512 shown in FIGS. 1A, 1B, 2 and 3 performs in the following manner. Assuming that the control system 510 is part of an appliance such as a dishwasher having a plurality of different operational wash cycles as recited above, an operator is able to select a particular wash cycle by placing a finger on the touch sensor switch 43. This shunts a portion of the oscillating signal from line 40 to ground preventing that portion from reaching the exclusive OR gate 47. As a result, a logical high output is generated at the output of exclusive OR gate 47 which is translated to a logical high at the input to NAND gate 100. When this is combined with the oscillating output of oscillator 100 and inverted by NAND gate 98, the result is a slow clock signal fed to the decade counter 114. Further, the clock signal causes the resetting of flip-flops 62, 176 and 178 via diodes 116, 181 and 182. Under this clock signal the counter 114 is caused to cycle through nine of its ten decoded outputs starting with 0, which also resets flip-flop 62 via diode 118, and ending with 8 which causes the resetting of the counter 114. During this process, alternate logical highs are generated at the 1 through 7 output terminals which are translated into the illumination of the neon lights representing the seven separate selectable operational cycles. When the desired operational cycle is reached, the operator removes his finger from sensor 43 and the corresponding output terminal of counter 114 remains in the logical high state with the corresponding neon light illuminated. The operator then has the choice of selecting either the power miser function or the sanitary wash function by pressing touch sensors 44 or 45. In either case, the results will be the change of state of corresponding flip-flops 176 and 178 due to their Q not output having been set high by the reset function and being connected to their D inputs. Therefore, selection of the power miser or the sanitary wash function will result in a logical high appearing at the Q outputs of flip-flops 176 and/or 178, respectively, and the corresponding illumination of their respective light emitting diodes 189 and 192. Further as a result of the maintenance of a logical high at one of the outputs of counter 114, a total cycle operational time will be determined via the decoder of FIG. 2 by the connection of terminal 230 through 236 to the output terminals of counter 114. The respective decoded operating time will be connected via terminals 256 through 262 to the inputs of counters 270 and 272. As flip-flop 62 remains in the reset condition, a logical high appears as its Q not output and is connected via terminal 286 to the preset enable inputs of counters 270 and 272. This causes the presetting of those counters and the display of the operating times via the display means 278 and 280. Further, a logical high on output terminal 3 of counter 114 causes the setting of flip-flop 290 and the resulting display of a numeral 1 in display means 292. When the START touch sensor 42 is touched to begin performance of the selected wash function, the Q not output of flip-flop 62 becomes a logical zero disabling the preset enable inputs of counters 270 and 272.

Returning to the selection of wash functions, the combination of a selection of one of the first four wash functions and either the Power Miser or Power Miser Not mode causes a logical high to appear at one of the switch terminals 212 through 219. This information which is then present at the switch means 513 of FIG. 4 enables the switch means to transmit information back to the control circuitry 512 on the rotational position of said cam means. The control cams 514 are formed in an assembly which is axially and angularly aligned. Each particular event of machine performance, which events may include one or more specific machine functions, is represented by a predetermined angular position of the control cams. The control cams 221, 223, 225 and 227 contain information on which angular positions, or machine events are included in each of the first four selectable wash functions indicated by the counter 114 outputs 1 through 4. When an angular position and the event it represents is included in a particular combination of wash function and power miser selection, which combinations again are represented by contacts 212 to 219, the respective cams 221, 223, 225 and 227 do not cause contact between the contacts 220, 222, 224 and 226 and the contacts 212 219 corresponding to the particular combination. When an angular position and corresponding event are not to be included, the respective cams 221, 223, 225 and 227 cause electrical contact with the corresponding contacts 220, 222, 224 and 226 and the positive voltage signal is coupled via line 524 back to the control circuitry 512 to cause further rotation of the cam motor 358 and control cams 516 to subsequent angular positions. This further rotation is caused by connection of the positive voltage through terminal 228 and AND gate 386 to the terminal 380. The signal is only passed through AND gate 386 by a combination of the start signal at the Q output of flip-flop 62 via terminal 400 and either of the positive signals from inverter 406, representing absence of a sani-wash mode of operation or the positive signal from the output of AND gate 404 via diode 408 representing the presence of the sani-wash mode from NOR gate 444 but the absence of a selection of the sani-wash mode from the Q not output of flip-flop 178 via terminal 448. The operation of the sani-wash mode is further described below.

During starting and stopping of the cam motor 358 and control cams 514, errors in angular position of the control cams 514 are prevented by the set of contacts 390. These contacts insure the connection of a positive voltage +V to the control 380 until the control cams 514 are located in a discrete predetermined angular position.

As mentioned, the cams included in the control cam assembly 514 which activate contacts 470 through 473 include timing information for each predetermined angular position or machine event. This information is coupled via the contacts 470-473 to the preset enable inputs of counter 348. As the cam motor 358 is rotated, the positive voltage at terminal 380 enables the preset inputs of counter 348 and thus the timing information is preset into the counter 348. One or more of the angular positions of the cam assembly 514 corresponds to a delay for a sani-wash heating operation, wherein the wash water is heated within the appliance to a predetermined temperature. The timing information located on the cams of contacts 470 to 473 is 1000, respectively, which because of inverter 476 appears at the inputs of NOR gate 444 as 0000. This is the only condition which causes the output of NOR gate 444 to be a logical high or positive voltage. All other combinations of timing information cause the output of NOR gate 444 to be a logical zero. Thus, during a sani-wash condition the clock input CL to counter 348 is disabled via inverter 406 and AND gate 346. The logical high from NOR gate 444 is also coupled to one input each of AND gates 394 and 404. Under those conditions when a sani-wash function is not selected terminal 448 is energized by a positive voltage from the Q not output of flip-flop 178. This causes the cam motor 358 to advance via AND gate 386 because the sani-wash function is specifically not coded onto any of the cams 221, 223, 225 and 227. When the selection of the sani-wash function is indicated by a logical high at the Q output of flip-flop 178, it is coupled to AND gate 394 via terminal 442 and AND gate 404 is disabled by a logical low from the Q not output of flip-flop 178. On the occasion of logical highs from NOR gate 444 and terminal 442, the cam motor 358 will only be rotated when the wash water is heated to a predetermined temperature as measured by thermostat 432. Under this condition a positive voltage is generated across resistor 424 to activate AND gate 394 and energize motor 358. This positive voltage also activates AND gate 418 along with a positive voltage from contacts 390 upon the rotation of control cams 514 to reset flip-flop 178 via terminals 436 and 438.

As mentioned, the output of NOR gate 444 is also coupled via diode 446 to the base of transistor 354. This causes the grounding of the gate terminal of triac 356 until a positive voltage from terminal 380 likewise grounds the base of transistor 354. To reiterate, whenever the output of NOR gate 444 indicates the absence of the sani-wash condition in the timing information it holds a logical zero which is inverted by inverter 406 to activate the clock CL of counter 348 and enable advancement of the control cams 514 via AND gate 386.

Please note that whenever a sani-wash condition is present at an angular position of the control cams, another cam thereof causes the connection of power to a heating element within the washer.

Another piece of information which is coded into the timing information from contacts 470 to 473 is a four second delay to allow rotation of deactivated motors within the appliance to cease prior to activation of a subsequent event. To accomplish this, information is caused to appear at contacts 470 to 473 as 0100, respectively. This is preset into counter 348 as a logical 4 or 0011 due to inverter 476. This information also appears at the inputs of AND gate 486 as 1111. This is the only condition which will allow the output of AND gate 486 to be a logical one and enables AND gate 490 to feed one second pulses from counter 326 to counter 348 via diode 492 and AND gate 348. Thusly, a four second delay is produced by counter 348. During all other conditions of the timing information from contacts 470 to 473 AND gate 490 is disabled and AND gate 342 is enabled to feed one minute pulses from counter 328 to counter 348.

The other timing information presented through contacts 470 to 473 is the timing information for the various events. During the specific performance of the events the corresponding timing information is preset into counter 348 and decremented by units at one minute intervals. During this counting down the count out not terminal $\overline{CO}$ is a logical high which prevents rotation of cam motor 358 via grounding of the gate terminal of triac 356. When the count of counter 348 becomes zero a logical low appears at the $\overline{CO}$ terminal to cause activation of cam motor 358.

In accordance with the above description, the presently claimed invention combines the cost and reliability advantages of cam controlled switching with the cost and reliability advantages of solid state digital control for complex control functions. The result is an optimum presentation of the widest variety of complex control functions.

The above description of the disclosed embodiment is intended to be illustrative of the presently claimed invention and is not intended to be taken in a limiting sense. Various modifications and changes may be made to the disclosed embodiment by persons skilled in the art without departing from the scope of the present invention as defined by the appended claims.

What is claimed is:

1. A control system for an appliance having a plurality of different operational cycles, comprising:
   cam operated switch means for controlling the coupling of electrical power to the appliance, said switch means including a plurality of rotatable cams for operating said switch means in response to the rotational position of said cams, said switch means being adapted for electrical rotation of said cams;
   digital electronic control circuit means for controlling said electrical rotation, said control circuit means including means for receiving a selection of any one of said cycles for the operation of said appliance; and
   second circuit means coupled between said switch means and said control circuit means and responsive to said means for receiving for supplying information on the rotational position of said cams to said control circuit means to enable control of said electrical rotation in accordance with a cycle selection.

2. The system of claim 1 wherein said cycles each includes a predetermined sequence of events and said information on said rotational position includes event identification means for enabling the performance of the predetermined event sequence for each selectable cycle.

3. The system of claim 1, further comprising means for transferring timing information from said switch means to said control circuit means, said timing information being dependent upon the rotational position of said cams and thereby upon said selection of operational cycle.

4. The system of claim 3, wherein said timing information is digitally coded in said switch means and further wherein said control circuit means includes a counter for counting timed pulses in response to said timing information to control the duration of cycle operation.

5. The system of claim 1, wherein said control circuit means includes a fixed period pulse generator and at least one pulse counter for timing each of said cycles in response to second digitally coded timing information.

6. The system of claim 5, wherein said second digitally coded timing information is stored in said control circuit means.

7. The system of claim 5, wherein each said cycle includes a plurality of events and further wherein said control circuit means includes a second pulse counter for timing each of said events in response to first digitally coded timing information.

8. The system of claim 7, wherein said first timing information is stored on said cams and further comprising means for transferring said first timing information from said switch means to said control circuit means.

9. The system of claim 1, wherein each of said cycles includes a predetermined sequence of events, said sequence being stored in said switch means.

10. The system of claim 1, wherein at least one of said cycles includes a predetermined content of different events, and further comprising means for modifying said event content of said one cycle in response to a selection of a control option.

11. The system of claim 10, wherein said means for modifying includes second means for receiving said selection of said control option, and storage means containing information for controlling the operation of said one cycle in response to said second means for receiving.

12. The system of claim 10, wherein said storage means includes additional cam operated switch means selectable in response to said second means for receiving.

13. A method for controlling an appliance having a plurality of different operational cycles, comprising:
   controlling the coupling of electrical power to the appliance by cam operated switch means including a plurality of rotatable cams for operating said switch means in response to the rotational position of said cams;
   rotating said cams by electromotive means;
   controlling said rotating of said cams with digital electronic control circuit means, said controlling including receiving a selection of any one of said cycles for the operation of said appliance; and
   coupling information on the rotational position of said cams from said switch means to said control circuit means, said coupling being responsive to a received said selection of an operational cycle to enable control of said rotating of said cams in accordance with a received cycle selection.

14. The method of claim 13, wherein each of said cycles includes a predetermined sequence of events and said coupling information includes identifying said events in accordance with a received said cycle selection for enabling the performance of said predetermined sequence of events for said cycle selection.

15. The method of claim 14, further comprising coupling timing information from said switch means to said control circuit means in accordance with the cycle corresponding to the rotational position of said cams.

* * * * *

REEXAMINATION CERTIFICATE (415th)
United States Patent [19]
Perry et al.

[11] B1 4,370,566
[45] Certificate Issued  Nov. 5, 1985

[54] APPLIANCE CONTROL SYSTEM

[75] Inventors: Leroy A. Perry, Danville; Charles E. Scott, Noblesville, both of Ind.

[73] Assignee: Emhart Industries, Inc., Indianapolis, Ind.

Reexamination Request:
No. 90/000,599, Jul. 30, 1984

Reexamination Certificate for:
Patent No.: 4,370,566
Issued: Jan. 25, 1983
Appl. No.: 254,377
Filed: Apr. 15, 1981

[51] Int. Cl.[4] .............................................. H01H 43/00
[52] U.S. Cl. .................................... 307/141; 68/12 R; 134/57 R
[58] Field of Search ............................ 307/141, 141.4; 68/12 R; 328/129.1, 130.1, 75, 72; 134/57 R, 57 D, 58 R, 58 D

[56] References Cited
U.S. PATENT DOCUMENTS

| | | | |
|---|---|---|---|
| 3,260,866 | 7/1966 | Martin | 307/141 |
| 3,798,465 | 3/1974 | Guth | 307/141 |
| 4,195,500 | 4/1980 | Tobita et al. | 68/12 R |
| 4,254,460 | 3/1981 | Achter et al. | 307/141 |

*Primary Examiner*—William M. Shoop, Jr.

[57] ABSTRACT

A control system for an appliance having a plurality of different operational cycles, provides cam operated switches for controlling the coupling of electrical power to the appliance, the switches including a plurality of rotatable cams for operating the switches in response to the rotational position of the cams, the switches being adapted for electrical rotation of said cams, a digital electronic control circuit for controlling the electrical cam rotation, the control circuit including circuitry for receiving a selection of any one of the cycles for the operation of the appliance, and a second circuit coupled between the switches and the control circuit and responsive to the circuitry for receiving for supplying information on the rotational position of the cams to the control circuit to enable control of the electrical rotation in accordance with a cycle selection.

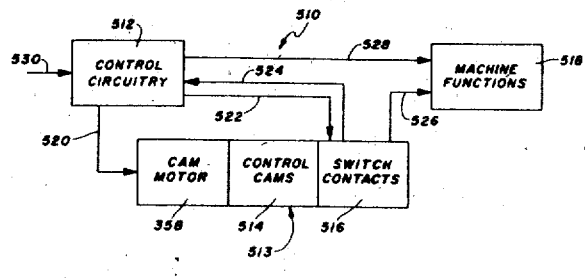

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 5, 8, 9, 14 and 15 are cancelled.

Claims 1, 4, 6, 7 and 13 are determined to be patentable as amended.

Claims 10–12, dependent on an amended claim, are determined to be patentable.

1. A control system for an appliance having a plurality of different operational cycles, comprising:
   cam operated switch means for controlling the coupling of electrical power to the appliance, said *cam operated* switch means including a plurality of rotatable cams for operating said *cam operated* switch means in response to the rotational position of said *rotatable* cams, said switch means being adapted for electrical rotation of said cams;
   digital electronic control circuit means for controlling said electrical rotation, said *digital electronic* control circuit means including means for receiving a selection of any one of said cycles for the operation of said appliance; [and]
   second circuit means *including at least one cam of* [coupled between] said *cam operated* switch means *coupled to* [and] said *digital electronic* control circuit means, *said cam* [and] responsive to said means for receiving *a selection of any one of said cycles* for supplying information on the rotational position of said [cams] *cam* to said *digital electronic* control circuit means to enable control of said electrical rotation in accordance with a cycle selection[.]; *and*
   *means transferring timing increments on said cams to said digital electronic control circuit for each event of a plurality of events of said cycle selection prior to termination of said event.*

4. The system of claim [3] *1, further* wherein [said] timing information *determining a length of said cycle selection* is digitally coded in said [switch] *cycle selection* means [and further] wherein said *digital electronic* control circuit means includes a counter for counting timed pulses in response to said timing information [to control the duration of cycle operation].

6. The system of claim [5] *1*, wherein [said second] digitally coded timing [information is] *increments are* stored in said *digital electronic* control circuit means.

7. The system of claim [5] *1*, wherein [each said cycle includes a plurality of events and further wherein] said *digital electronic* control circuit means includes a second pulse counter for timing each of said events in response to *first* [first] digitally coded timing [information] *increments*.

13. A method for controlling an appliance having a plurality of different operational cycles, comprising:
   controlling the coupling of electrical power to the appliance by cam operated switch means including a plurality of rotatable cams for operating said *cam operated* switch means in response to the rotational position of said cams;
   rotating said cams by electromotive means;
   controlling said rotating of said cams with digital electronic control circuit means, said controlling including receiving a selection of any one of said cycles for the operation of said appliance; [and]
   coupling information on the rotational position of said cams from said [switch means] *cams* to said *digital electronic* control circuit means, said coupling being response to a received said selection of an operational cycle to enable control of said rotating of said cams in accordance with a received cycle selection[.]; *and*
   *coupling timing increments on said cams to said digital electronic control circuit means for each event of a plurality of events of said cycle selection prior to termination of said event.*

* * * * *